UNITED STATES PATENT OFFICE.

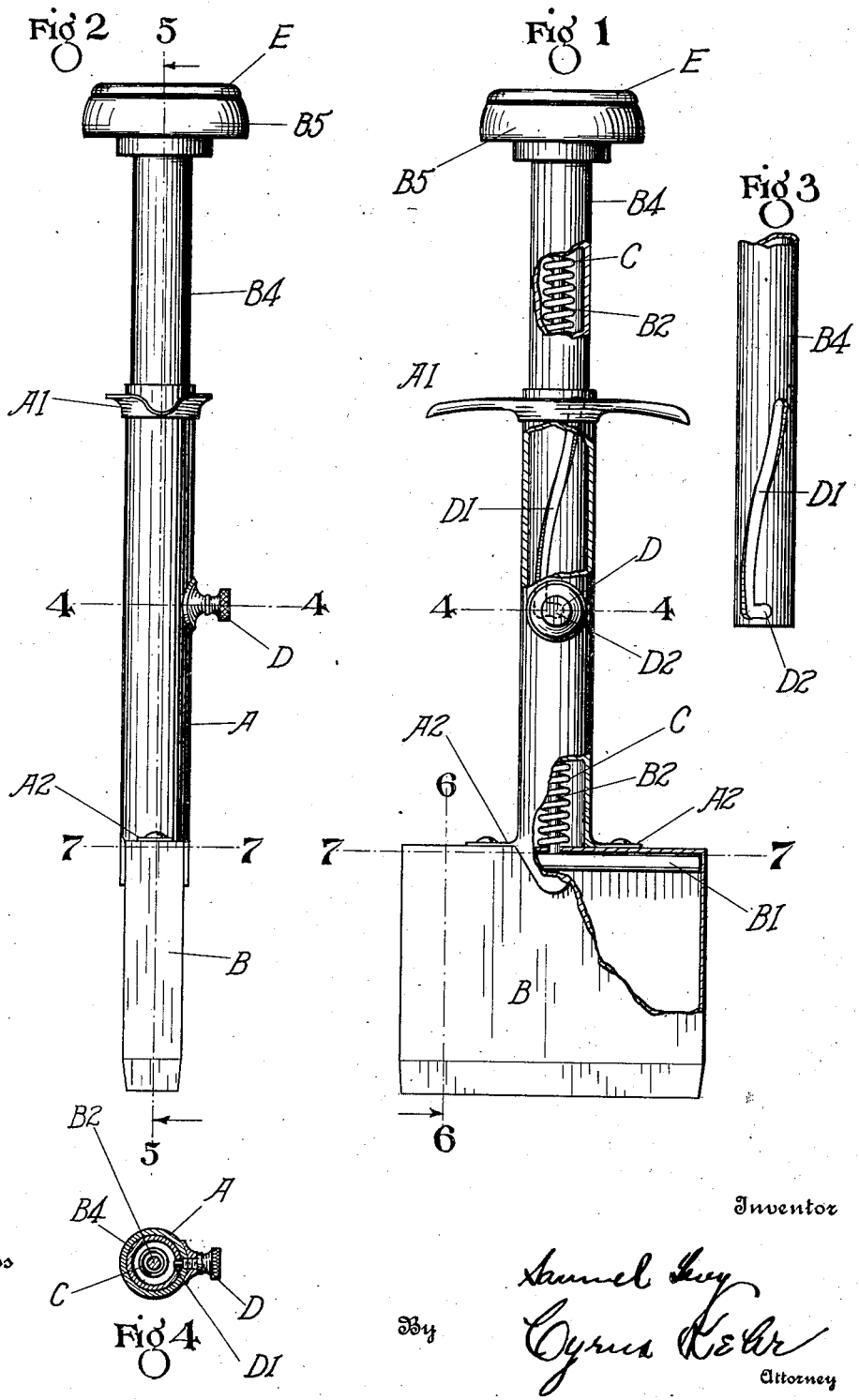

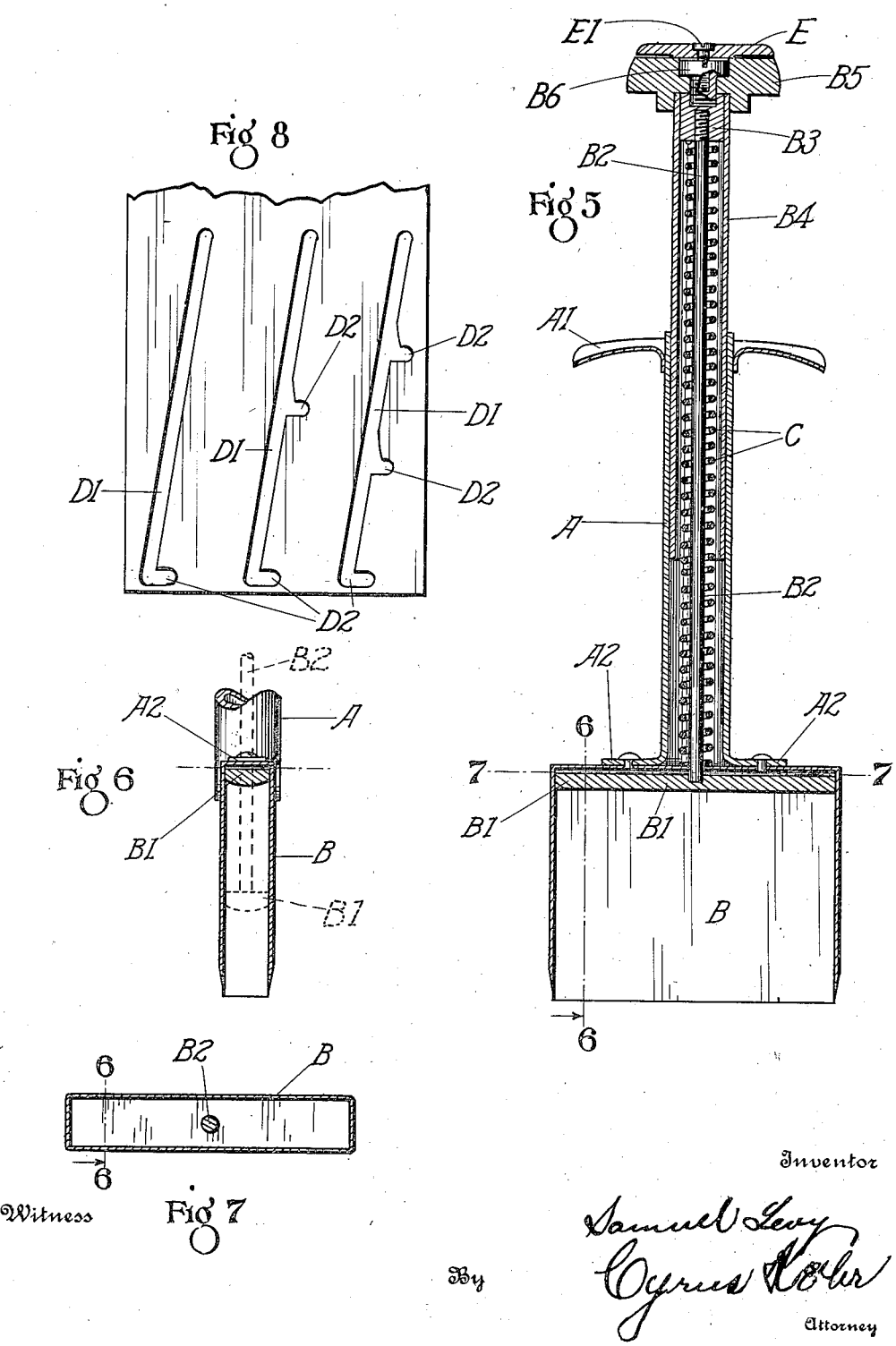

SAMUEL LEVY, OF KNOXVILLE, TENNESSEE.

ICE-CREAM DIPPER.

1,352,756.  Specification of Letters Patent.  Patented Sept. 14, 1920.

Application filed September 16, 1919. Serial No. 324,201.

*To all whom it may concern:*

Be it known that I, SAMUEL LEVY, a citizen of the United States, residing at Knoxville, in the county of Knox and State of Tennessee, have invented a new and useful Improvement in Ice-Cream Dippers, of which the following is a specification, reference being had to the accompanying drawings.

My improvement relates particularly to hand tools adapted to take from a mass of ice cream a body of ice cream in form to be used for the filling of an ice cream sandwich. The object of the invention is to provide such a mechanism in simple and convenient form. A further object of the invention is to provide such a dipper so constructed as to permit the easy forming of a layer or cake composed of a plurality of kinds of ice cream.

In the accompanying drawings,

Figure 1 is a side elevation of a mechanism embodying my improvement, portions being broken away;

Fig. 2 is an elevation looking at Fig. 1 from the left;

Fig. 3 is a detail of the guide tube;

Fig. 4 is a transverse section on the line, 4—4, of Figs. 1 and 2;

Fig. 5 is an upright section on the line, 5—5, of Fig. 2;

Fig. 6 is an upright section on the line, 6—6, of Figs. 1, 5 and 7;

Fig. 7 is a horizontal section on the line, 7—7, of Figs. 1, 2 and 5;

Fig. 8 shows a modification.

Referring to said drawings, A is a tubular handle on the upper end of which is a cross-head, $A^1$. The lower end of said tubular handle is spread to form a foot, $A^2$, to which is attached the hollow dipper body, B. Said body is shown in transverse cross section in Fig. 7. Said body is open at its lower end and in one direction the transverse cross section of said body is much reduced relative to the corresponding dimension in the other direction. In other words, said cross section is elongated. Thus the dipper is adapted to receive a quantity of ice cream which will form a flat sheet or cake which is of rectangular form.

Within the body, B, is a plunger body, $B^1$, which loosely fills the cross section of the body, B, and is rigidly attached to the stem, $B^2$, which extends along the axial line of the handle, A, and has its upper end threaded into the plug, $B^3$, which fills the upper end of the guide tube, $B^4$, which telescopes into the handle, A, and is of proper length to bear against the upper face of the body, B, when the stem, $B^2$, has been moved downward far enough to bring the plunger, $B^1$, into the mouth of the body, B. The guide tube is to be regarded as a part of the plunger stem. The lower edge of the plunger, $B^1$, is preferably made round or convex transversely, in order that the cake of ice cream being expelled from the body, B, will have a minimum adhesion to the plunger, practical tests having shown that this feature is desirable.

An expanding coiled spring, C, surrounds the plunger stem, $B^2$, within the tubular handle, A, and the guide tube, $B^4$, the lower end of the spring bearing against the body, B, of the dipper and the upper end of the spring bearing against the plug, $B^3$. When the guide tube is free to be moved upward, the coiled spring presses the plug, $B^3$, upward whereby the plunger stem and the plunger and the guide tube are pushed upward to their upper limit.

A stop member, D, is threaded through the wall of the tubular handle and projects into a slot, $D^1$, in the tubular guide.

In Figs. 1 and 3, the guide tube has a single slot, $D^1$, which is preferably slightly spiral and has a single lateral notch, $D^2$, which is adapted to engage the stop member, D, to hold the guide tube against upward movement. By this means the plunger may be secured in its uppermost position.

A head, $B^5$, is seated on the upper end of the guide tube, $B^4$, and is secured by means of a screw, $B^6$, which extends through the head and into the plug, $B^3$, and has its head flush with the upper face of the head, $B^5$. Said head, $B^5$, is made to so engage the guide tube as to be immovable on the latter.

A pivoted disk-form head, E, is placed immediately above the head, $B^5$. A screw post, $E^1$, extends loosely downward through the head, E, and is threaded into the screw, $B^6$, on the axial line of the latter, the screw post being long enough to leave the head, E, free to rotate on said post.

The notch, $D^2$, is at the side of the slot, $D^1$, toward which said slot leans, so that when the guide tube is moving upward to its upper limit, the stop member, D, will press against the wall of the slot at the side at which the notch is located and thus position the stop member to readily enter the notch when said member and said notch attain the same level and the hand of the operator slightly turns the head, B⁵, in the appropriate direction. By the engagement thus formed by the stop member in the notch the plunger is held immovably at its upper limit ready for filling the dipper by downward pressure.

When the dipper has been filled, the head, B⁵, is grasped by the hand and turned to cause the guide tube to turn in the proper direction for releasing the stop member from the notch, D². When that release has been effected, downward pressure of the hand on the free head, E, will cause the guide tube, stem and plunger to move downward, the latter moving to the mouth of the dipper and discharging the contents from the dipper. During the endwise movement of the guide tube, the latter is turned by its travel on the stop member, D, the latter moving relatively in the slot, D¹. But while the guide tube is thus turning, the plunger stem, B², can not turn, for it is rigid on the plunger body, B¹. Such turning of the guide tube is effected by the plug, B³, turning on the threads on the upper end of the stem.

The stop member, D, is threaded transversely through the wall of the handle, A, and enters the slot, D¹. When the stop member is in this position, the guide tube can be turned only as far as the lateral range of the slot, D¹, and the notch, D², permit, the turning taking place while the guide member is moving endwise.

The guide tube is normally raised to its uppermost position by the spring, the stop member being in the notch, D², so that the plunger is in its upper position and locked against downward movement when pressure is applied to the guide tube to drive the dipper into a mass of ice cream.

When the plunger and the guide tube are to be removed from the body, B, and the handle, A, the stop member is withdrawn from the slot, D¹, to render the guide tube free for rotation. The head, B⁵, is then turned. Thereby the plug, B³, is turned on the upper end of the stem until these parts are separated. Then the guide tube may be moved upward out of the handle and the plunger and the plunger stem may be moved downward out of the handle and the dipper body.

The dipper may be operated by one hand, the cross head, A¹, being engaged by two fingers and the thumb resting on the heads, E and B⁵.

In Fig. 8, the guide tube is provided with three slots, D¹, the drawing showing the tube bent into a plane for the purpose of better indicating the position of the slots. One of these slots has only the lower notch, D², as in Figs. 1 and 3. The next slot has an additional notch, D², midway between the ends of the slot. This permits setting the plunger at the middle of its path, in order that one-half of the dipper body may be filled with one kind of ice cream and the plunger then shifted into position to fill the other half of the dipper body. The next slot is provided with two additional notches. This permits setting the plunger successively in three positions and filling one-third of the dipper with ice cream when the plunger is at each of the three positions. If the dipper is to be used for serving only one kind of ice cream, the stop member, D, is extended into the first slot. If the dipper is to be used for serving two kinds of ice cream, the stop member is extended into the second slot. If the dipper is to be used for serving three kinds of ice cream, the stop member is extended into the third slot. Thus the dipper is adapted to meet these varying needs.

Assuming that the stop member is in the third slot, for engaging the stop member in either of the upper notches, D², it is not necessary to manually slightly rotate the guide tube. It is necessary only to press downward on the head, E, until the appropriate notch has passed below the stop member and then release the pressure on the head, E, to let the guide tube rise in response to the action of the spring, C. Then the stop member will bear against the side of the slot at which the notches are located, and the stop member will enter the notch as soon as the latter is opposite the stop member. In this step advantage is taken of the yielding resistance of the guide tube to turning. When three kinds of ice cream are to be taken into the dipper, the guide tube is first depressed until the upper notch, D², is below the stop member. Then the tube is allowed to return through the action of the spring until the stop member enters the upper notch. Then the dipper is pressed into a mass of ice cream until the dipper is filled as far as the position of the plunger permits. Then the hand of the operator turns the head, B⁵, slightly in the appropriate direction to release the stop member from the upper notch, whereupon the guide tube again rises by the action of the spring until the stop member engages in the middle notch. Then the dipper is driven into another mass of ice cream, whereby the cream already in the dipper is driven upward as far as the plunger permits and a corresponding quantity of the ice cream of the second mass enters the lower part of the dipper. Then the stop member is released from the middle notch by again turning the head, B⁵, whereupon the guide tube rises to its upper limit in position for manual locking by turning the head, B⁵. Then the dipper is driven into the third mass of ice cream.

It is to be understood that the notches, D², and the stop member are to be of such relative dimensions as to facilitate engagement of the stop member by the notches. If the diameter of the stop member is to be increased, then the notches should be made larger. Doing that will be facilitated by increasing the inclination of the slots, $D^i$.

I claim as my invention,

1. In a mechanism of the nature described, the combination of a hollow body, a tubular handle rigid on said body and extending in the same direction as the body, a plunger head located within said body, a stem extending from the plunger head through the tubular handle, a guide tube rotatably attached to the upper end of said stem and telescoping with the tubular handle, one of said tubular members being slotted and notched and the other bearing a stop member arranged to relatively travel in the slot and engage in the notch of the other of said tubular members, substantially as described.

2. In a mechanism of the nature described, the combination of a hollow body, a tubular handle rigid on said body and extending in the same direction as the body, a plunger head located within said body, a stem extending from the plunger head through the tubular handle, a guide tube rotatably attached to the upper end of said stem and telescoping into the tubular handle and having a notched slot, and a stop member seated on the handle and extending into the slot of the guide tube, substantially as described.

3. In a mechanism of the nature described, the combination of a hollow body, a tubular handle rigid on said body and extending in the same direction as the body, a plunger head located within said body, a stem extending from the plunger head through the tubular handle, a guide tube rotatably attached to the upper end of said stem and telescoping with the tubular handle, one of said tubular members being slotted and notched and the other bearing a stop member arranged to relatively travel in the slot and engage the notch of the other of said tubular members, and a spring tending to move the plunger in one direction, substantially as described.

4. In a mechanism of the nature described, the combination of a hollow body, a tubular handle rigid on said body and extending in the same direction as the body, a plunger head located within said body, a stem extending from the plunger head through the handle, a guide tube rotatably attached to the upper end of said stem and telescoping into the tubular handle and having a notched slot, a stop member seated on the handle and extending into the slot of the guide tube and a spring tending to move the plunger in one direction, substantially as described.

5. In a mechanism of the nature described, the combination of a hollow body, a tubular handle rigid on said body and extending in the same direction as the body, a plunger head located within said body, a stem extending from the plunger head through the tubular handle, a guide tube attached to the upper end of said stem and telescoping with the tubular handle, one of said tubular members being obliquely slotted and notched and the other bearing a stop member arranged to relatively travel in the slot and engage in the notch of the other of said tubular members, substantially as described.

6. In a mechanism of the nature described, the combination of a hollow body, a tubular handle rigid on said body and extending in the same direction as the body, a plunger head located within said body, a stem extending from the plunger head through the tubular handle, a guide tube attached to the upper end of said stem and telescoping into the tubular handle and having an obliquely notched slot, and a stop member seated on the handle and extending into the slot of the guide tube, substantially as described.

7. In a mechanism of the nature described, the combination of a hollow body, a tubular handle rigid on said body and extending in the same direction on the body, a plunger head located within said body, a stem extending from the plunger head through the tubular handle, a guide tube attached to and turnable on the upper end of said stem and telescoping with the tubular handle, one of said tubular members being slotted and notched and the other bearing a stop member arranged to relatively travel in the slot and engage in the notch of the other of said tubular members, substantially as described.

8. In a mechanism of the nature described, the combination of a hollow body, a tubular handle rigid on said body and extending in the same direction as the body, a plunger head located within said body, a stem extending from the plunger head through the tubular handle, a guide tube attached to and turnable on the upper end of said stem and telescoping into the tubular handle and having a notched slot, and a stop member seated on the handle and extending into the slot of the guide tube, substantially as described.

9. In a mechanism of the nature described, the combination of a hollow body, a tubular handle rigid on said body and extending in the same direction as the body, a plunger head located within said body, a stem extending from the plunger head through the tubular handle, a guide tube attached to the upper end of said stem and telescoping with the tubular handle, one of said tubular members being slotted and notched and the other bearing a stop member arranged to relatively travel in the slot and engage the notch of the other of said tubular members, and a spring surrounding the stem within said tubular members and tending to move the plunger in one direction, substantially as described.

10. In a mechanism of the nature described, the combination of a hollow body, a tubular handle rigid on said body and extending in the same direction as the body, a plunger head located within said body, a guide member in operative relation with the plunger head for endwise movement with said head and in operative relation with the tubular handle to convert the endwise movement of said guide member into a spiral movement, and a head pivoted on the upper end of said guide member, substantially as described.

11. In a mechanism of the nature described, the combination of a hollow body, a tubular handle rigid on said body and extending in the same direction as the body, a guide tube telescoping into said handle, a plug in the upper end of the guide tube, a plunger in the hollow body, a stem extending from the plunger upward through the tubular handle and the tubular guide and threaded into said plug, an expanding coiled spring surrounding said stem and tending to lift the guide tube, stem and plunger, and a head on the upper end of said guide tube, substantially as described.

12. In a mechanism of the nature described, the combination of a hollow dipper body, a plunger head within the body, two telescoping tubular members, the outer of said members being a handle attached to the dipper body and the inner of said members being a guide tube, and one of said tubular members having a plurality of slots with diverse numbers of notches and the other of said tubular members bearing a stop member adapted to be extended interchangeably into the slots of the other tubular member, and a stem placing said guide tube in operative relation with the plunger head to compel said tube and head to move endwise in unison and to permit rotation of said tube in relation to said plunger and said handle, substantially as described.

13. In a mechanism of the nature described, the combination of a hollow dipper body, a plunger head within the body, two telescoping tubular members, one being a handle attached to the dipper body and the other being a guide tube in operative relation with the plunger head, one of said tubular members having a plurality of slots with diverse numbers of notches and the other of said tubular members bearing a stop member adapted to be extended interchangeably into the slots of the other tubular member, and an expanding spring located within said tubular members and tending to move the tubular member which is in operative relation with the plunger head away from the dipper body, substantially as described.

In testimony whereof I have signed my name, this 11th day of September, in the year one thousand nine hundred and nineteen.

SAMUEL LEVY.